United States Patent [19]
Mitchell et al.

[11] Patent Number: 6,055,245
[45] Date of Patent: *Apr. 25, 2000

[54] APPARATUS AND METHOD FOR DIGITALLY CONVEYING ALERT TONES BETWEEN AN ANALOG MODEM AND AN ISDN TERMINAL ADAPTER

[75] Inventors: Eric P. Mitchell, Ogden; Connie D. York, Riverton; Richard A. Kunz, Draper; Jeffrey A. Hanline, Bountiful; David M. Arnesen, West Jordan; Gerald A. Wilson, South Jordan, all of Utah

[73] Assignee: 3COM Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/831,459

[22] Filed: Mar. 31, 1997

[51] Int. Cl.[7] .................................. H04J 1/02; H04J 3/12; H04M 3/00
[52] U.S. Cl. .......................... 370/493; 370/522; 370/525; 379/418
[58] Field of Search ........................... 370/522, 524–526, 370/366, 419, 420, 463, 466, 493; 379/399, 93.4, 283, 418; 455/450, 457; 375/219, 222

[56] References Cited

U.S. PATENT DOCUMENTS

| 4,211,895 | 7/1980 | Davis et al. | 379/398 |
|---|---|---|---|
| 5,113,396 | 5/1992 | Kagami | 370/525 |
| 5,711,012 | 1/1998 | Bottoms et al. | 455/557 |
| 5,815,505 | 9/1998 | Mills | 370/522 |

*Primary Examiner*—Alpus H. Hsu
*Assistant Examiner*—Afsar M. Qureshi
*Attorney, Agent, or Firm*—Workman, Nydegger & Seeley

[57] ABSTRACT

An apparatus and method for facilitating interaction during a communication session between an analog modem and a terminal adapter for conveying digital alert tones and control data therebetween is provided. The embodiments provide for a collateral digital communication path between a microcontroller of an analog modem and a microcontroller of a terminal adapter for selectively relaying digital alert tones and control data therebetween. One embodiment utilizes a cellular interface of an analog modem for tapping and evaluating information for the presence of control data. Upon successful identification of control data, the microcontroller of a terminal adapter is notified and the specific control data detected in identified. By providing a method of apparatus for digitally relaying control data, accuracy of identification of control data by a terminal adapter is enhanced by foregoing needless signal transformation and retransformation.

27 Claims, 4 Drawing Sheets

APPARATUS AND METHOD FOR DIGITALLY CONVEYING ALERT TONES BETWEEN AN ANALOG MODEM AND AN ISDN TERMINAL ADAPTER

BACKGROUND OF THE INVENTION

1. The Field of the Invention

The field of the invention relates to interfacing computer devices with a digital network such as an Integrated Services Digital Network (ISDN) system. Additionally, the invention also relates to interfacing analog devices with the ISDN system, such as adapting analog modems to compatibly interface to the digital network. More particularly, the invention relates to the transmission of digital control information from a computer system directly to a digital network interface.

2. Present State of the Art

Through the recent decades, the majority of data transmitted between two locations occurred using analog transmission devices such as analog modems. An analog modem operates by modulating data and transmitting the modulated data as an analog signal across a transmission medium. Analog modems also receive modulated data as analog signals and perform the demodulation and conversion back to digital form. Most analog modems transmit and receive modulated data in analog form over the present public switched telephone network (PSTN) which employs a twisted pair of wires as the transmission medium. The twisted pair of wire transmission medium coupled with the switching and routing infrastructure of the communication system contribute to creating a bandwidth limited configuration. In communications where additional bandwidth was required, dedicated leased analog lines were employed to satiate increased bandwidth appetites. Such enhanced configurations typically were comprised of a plurality of twisted pair interconnection mediums.

A vast number of communication applications today require substantial amounts of data to be downloaded or transmitted through the communication medium. To accommodate a user's desire to have such substantial amounts of data dispatched within a reasonable amount of time, transmission services were developed capable of a higher band width. To provide compatibility with established communication infrastructure, telecommunication providers have begun to offer digital transmission services over communication medium previously facilitating only analog communications. Digital transmission services such as, for example, T1 services, E1 services, and Integrated Services Digital Network (ISDN). The majority of such digital transmission services employ the established twisted pair communication infrastructure medium, coupled to a digital network through a digital interface circuit. Such digital communication standards provide enhanced bandwidth capabilities for users. For example, a typical T1 connection employs a data rate of 1.544 MPS (Megabits per second) which may be comprised of a number of logical channels, such as 24, for distribution to a plurality of users. ISDN systems communication information and control signals through different channels which are multiplexed in a time divided fashion such as a time multiplex (TDM) signal. The TDM signal comprises two communication channels or B channels which are separately called B1 or B2 and a single control channel which is called a D channel. Each B channel is configured to facilitate transmission of 64 Kbps. while the one D channel operates at 16 Kbps. Specifications of ISDN, T1, and E1 services are described in CCITT (International Telegraph and Telephone Consultive Communication) recommendations.

FIG. 1 depicts a conventional interface with established components to an ISDN system. A conventional computer or terminal 100 provides the appropriate user interface, such as ISA, EISA, PCI, or PCMCIA, to an analog modem 102 and provides modulation and demodulation transformation of the data as described above. In prior art transmission configurations, analog modem 102 interfaces directly with the PSTN to provide modulated and demodulated analog data over the previously established network. To transform such analog modulated data for use on a digital network, a terminal adapter 106 is known in the prior art to transform the analog modulated data to digital format. Conventional transformations employed analog and digital converters to convert or quantize the modem modulated signal to digital form prior to transmitting such a signal over the digital network. Terminal adapters 106 having an analog input for receiving data from an analog modem 102 are known in the art. Terminal adapter 106 digitizes the modem signals and multiplexes the signals with other digital signals and transmits them accordingly throughout the digital network. Terminal adapter 106 interfaces with analog modem 102 over an established interface known as the R interface 104. Terminal adapter 106 further couples with a network termination (NT-1) 110 over a defined S/T interface 108. In turn, network termination 110 interfaces with ISDN system 114 over a defined U interface 112.

FIG. 2 depicts a more detailed block diagram configuration for interfacing a terminal 100 with ISDN system 114. Typically, an analog modem 102 is comprised of a microcontroller 120 for receiving digital data from terminal 100 directly and for controlling other operations and functions of analog modem 102. A DSP 122 receives digital data from microcontroller 120 and performs the modulation and demodulation functions associated with transforming digital data into analog modulated information. A CODEC 124 receives modulated data in digital form and performs the actual digital to analog and the reciprocal analog to digital transformations of such information. A data access arrangement (DAA) 126 provides the circuitry necessary for accessing or transmitting an analog signal according to the requirements of the communication network such as PSTN. This includes isolators, transformers, and other mechanism standards in the art allowing connection between systems having different electrical characteristics and requirements.

A terminal adapter 106 couples to analog modem 102 and receives data therefrom into an analog to digital converter 128. Analog to digital converter 128 transforms the analog data into digital form for processing by microcontroller 130. The transformed modulated digital data is then multiplexed into the digital communication B channels and alternatively, D channel previously discussed. An S/T interface 132 provides the appropriate interface required by network termination 110.

As shown, data originating in digital form from terminal 100 passes digitally to microcontroller 120 and thereafter is converted into analog form for transporting to terminal adapter 106. Upon receipt by terminal adapter 106, the originally digital signal that is now in modulated analog form is transformed again back to digital form by analog to digital converter 128. The digitized data retains the modulation information necessary for proper reverse conversion on the receiving end.

Some terminals 100, utilizing an analog modem 102 for transporting data, employ an ISDN system 114 as a transport network for distributing data with a recipient user. Such terminal devices 100 employing an analog modem 102 as their data transmission gateway, modulate the transmitted data prior to distributing such data in digitized format throughout the ISDN system. As such, when a destination terminal 100 receives digitized data, such digitized data must undergo a digital to analog transformation in the terminal adapter prior to being received by analog modem 102. Such additional data transformations may introduce distortion because of the multiple conversions which occur. Furthermore, each additional conversion which may introduce distortion, may result in a conversions errors and hence a loss of accuracy due to each conversion.

Additionally, terminal 100 must generate call setup information signals, typically DTMF tones, which are interpreted for use in establishing and routing the call. A typical analog modem 102 generates the DTMF tones for modulation over the PSTN. However, in a digital network, terminal adapter 106 which interfaces to ISDN system 114 must generate the call setup signaling by interpreting the call setup signaling that was once in digital format at terminal 100, but that has become modulated DTMF tones when received at terminal adapter 106. Analog to digital converter 128 in terminal adapter 106 then must quantize modulated DTMF tones which in turn are evaluated and interpreted by microcontroller 130 of terminal adapter 106. Such conversion from digital form at terminal 100 to analog modulated form and then back to a quantized form for consumption by terminal adapter 106 may introduce errors and create unnecessary inefficiencies for locally consumed call setup and control signals.

It would, therefore, be an advancement in the art to provide an apparatus for digitally conveying digital control signals and alert tones between an analog modem and a terminal adapter without the need to transition such control signals through an analog transformation.

Yet another advancement in the art would be to provide an apparatus for digitally conveying digital control signals and alert tones between a cellular modem and a terminal adapter without requiring the intermediate conversion of such signals into modulated analog signals.

A further advancement in the art would be to provide a method for digitally conveying control signals and alert tones between an analog modem and an ISDN system during a communication session.

A still further advancement in the art would be to provide a method for digitally conveying control signals and alert tones between a cellular modem and an ISDN system during a communication session.

SUMMARY AND OBJECTS OF THE INVENTION

It is, therefore, an object of the present invention to facilitate interaction during a communication session between an analog modem and an ISDN or other digital network for digitally conveying digital alert tones between the analog modem and a terminal adapter.

It is yet another object of the present invention to facilitate interaction during a communication session between a cellular modem and an ISDN or digital network for digitally conveying digital alert tones between the cellular modem and the terminal adapter.

It is yet another object of the present invention to allow an analog modem to digitally convey control information and dialing directives directly to a terminal adapter without requiring the digital data to undergo distortion inducing digital to analog and analog to digital transformations.

It is a further object of the present invention to facilitate digital transmission of control data and feedback from a terminal adapter directly to an analog modem.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an apparatus and method for digitally conveying digital alert tones between an analog modem and a terminal adapter is presented.

The present invention incorporates a digital control and data path between a microcontroller of an analog modem and a microcontroller of a terminal adapter. The microcontroller of the analog modem dispatches the digital control data along a collateral path comprising decoding circuitry for evaluating such control data and promptly notifying a terminal adapter microcontroller of the detection of such data. The microcontroller of the terminal adapter may then directly receive, evaluate, and correspondingly respond to such control data.

In many instances, such a collateral control data path minimizes or eliminates distortion induced by signal transformation in an analog modem followed by a subsequent reverse-transformation in the terminal adapter.

One exemplary embodiment of the present invention utilizes a digital serial cellular modem interface of an analog modem for accessing control data in digital form. One application of such an exemplary embodiment is to serially buffer data received from the cellular modem interface and then compare such data with known values of digital alert tones and control data. When such a match is not encountered, data processing proceeds through modulation and coding processes for transmission to a terminal adapter over the analog interface. However, when alert tones or control data destined for consumption by the terminal adapter are encountered, notification of the presence of such data is directly sent to the terminal adapter microcontroller.

Furthermore, when the terminal adapter microcontroller receives such digital control data, the microcontroller of the terminal adapter may process the digital data directly without any pre-processing or data reverse-transformation. This is particularly beneficial in reducing transformation error and such direct processing of digital control signals may minimize call setup delay.

A terminal adapter possessing such processing abilities comprises a modem controller access means, a data evaluating means, and a terminal adapter controller access means thereby constituting a collateral alert tone and control data channel or path. The modem controller access means couples to the microcontroller of the analog modem either directly to a communication bus or port, or in an alternate embodiment, electrically couples to a cellular modem interface for receiving digital data directly from the analog modem.

In the exemplary embodiment, digital data is tapped directly from the analog modem's microcontroller bus. Such digital data is then buffered and transferred to a data evaluating means wherein the data is compared with known patterns or values of digital alert tones and control data. A comparative match then alerts the terminal adapter controller access means which informs the terminal adapter microcontroller of the presence of a digital alert tone or control data.

While the exemplary embodiment shows a parallel bus interface to the analog modem's microcontroller, an alternative embodiment employs a serial bus interface compatible with cellular modems. Such serial data is then converted into parallel data for comparison with the known digital alert tones and control data patterns. Subsequent interfacing with the terminal adapter microcontroller is then consistent with previously discussed preferred embodiment.

Naturally, other forms of digitally evaluating and conveying digital alert tones and control data from an analog modem to a terminal adapter may also be implemented as part of the present invention. For example, a serial data path may be employed throughout by utilizing serial comparitors for evaluation of transferred data.

These and other objects and features of the present invention will be more fully apparent from the following description and appended claims, or may be learned by the practice of the invention as set forth herein.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
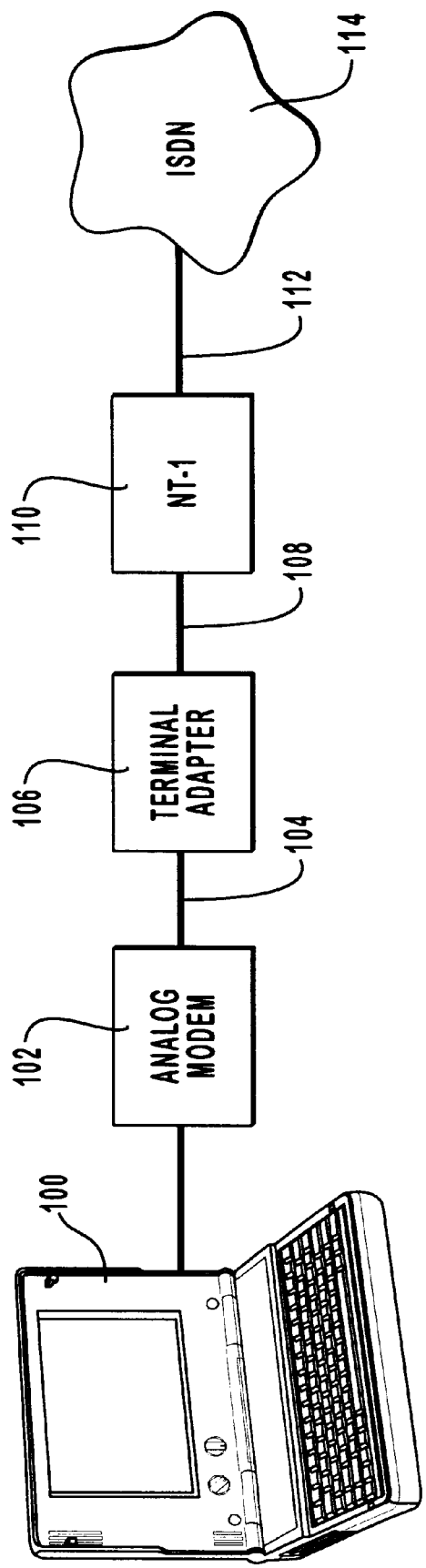
FIG. 1 is a block diagram of an interface architecture for configuring a terminal having an analog modem to interface with a digital network.

FIG. 1 is a block diagram of the interface architecture for configuring a terminal having an analog modem to interface with a digital network. A digital network may take the form of a number of standard digital networks one of which includes an Integrated Services Digital Network (ISDN) system 114. ISDN system 114 represents an emerging technology which is aimed at replacing the existing analog telephone network with an all digital network capable of handling digital communications as well as voice communications. Numerous suppliers are now offering ISDN interface adapters for personal computers, and with the acceptance by the public of the Internet system, the desire for enhanced bandwidth capable devices for distributing and delivering digital data is increasing.

Because digital networks are emerging technologies, there presently exists an abundance of resources and interfaces that have heretofore employed analog communication techniques over analog communication networks such as PSTN networks. Therefore, to interface such analog equipment with a digital network requires intermediary devices capable of transforming analog communication signals into digital formats for compatibility with digital networks.

A terminal 100 provides a user interface for receiving and transmitting communication data throughout a network. Terminal 100 may be a personal computer or other interface device capable of such data processing. For data transmission and reception from an external source, a terminal 100 has generally employed an analog modem 102 for transforming digital data resident within terminal 100 into an analog form for transmission throughout a communication network. As different devices transform or condition signals from an analog form to a digital form, digital communications standards have defined interfaces between such devices. For example, analog modem 102 presents an R interface 104 for compatible interfacing by a subsequent transformation device.

A terminal adapter 106 interfaces with analog modem 102. A terminal adapter 106 converts analog signals received from analog modem 102 into digital signals for transmission to ISDN system 114. Various types of terminal adapters are generally known in the art having varied levels of integration and interfaces for coupling to other equipments. In the present invention, a terminal adapter 106 presents an S/T interface 108 for compatible interaction with network termination 110. Network termination 110 provides functions associated with the physical and electrical termination with ISDN system 114 through a U interface 112.

Figure 2:
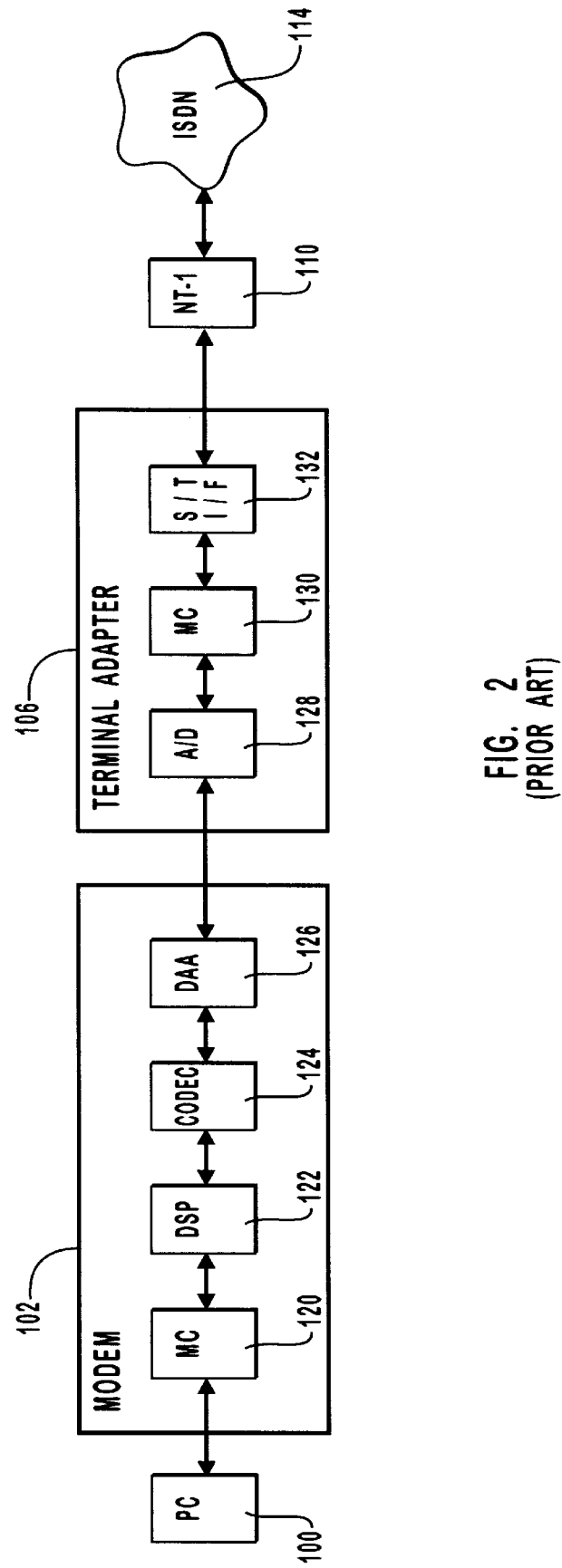
FIG. 2 is a prior art block diagram for transmitting digital alert tones, control data, and informational data from a terminal through an analog modem to a digital network.

FIG. 2 is a prior art block diagram for transmitting digital alert tones, control data and informational data from a terminal through an analog modem to a digital network.

Figure 3:
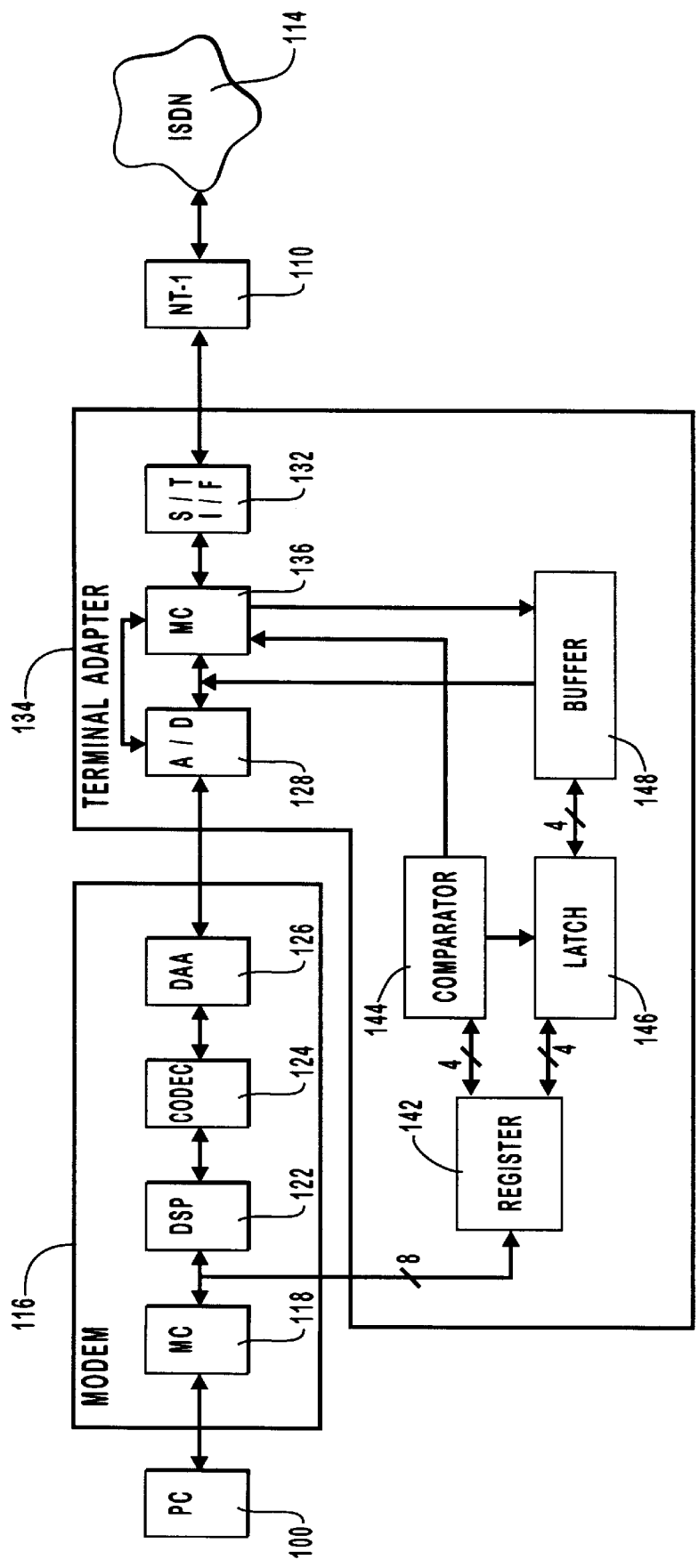
FIG. 3 is a block diagram of a terminal configured with an analog modem for digitally conveying digital alert tones between the analog modem and a terminal adapter, in accordance with a preferred embodiment of the present invention.

FIG. 3 is a block diagram of a terminal configured with an analog modem for digitally conveying digital alert tones between the analog modem and a terminal adapter, in accordance with a preferred embodiment of the present invention.

Analog modem 116 typically comprises a microcontroller 118 for receiving digital information from terminal 100. Microcontroller 118 couples to DSP 122 for modulating digital data in preparation for transmission. DSP 122 further couples with codec 124 for converting digital signals to analog signals in final preparation for transmission across a transmission medium. DAA 126 provides a traditional physical interface with a PSTN analog telephone system. Analog modem 116 then couples directly to terminal adapter 134 wherein the now analog modulated information is then quantized from analog to digitized modulated data via analog to digital converter 128. Such transformed data is then presented to microcontroller 136 for evaluation and when received data is to be further distributed to ISDN system 114, then microcontroller 136 configures such data for delivery to an S/T interface 132.

Data transmitted over ISDN system 114 originating from terminal 100 is transmitted in digital form, however, such data remains modulated as is necessary for demodulation by a symmetric receiving analog modem 102. However, there are some forms of data which are consumed by microcontroller 136 such as data related to call setup and processing. Such digital signals originating from terminal 100 are unnecessarily modulated in the prior art embodiments, and must be evaluated in such a condition by the terminal adapter microcontroller. Such unnecessary transformation of control signals may introduce distortion and false interpretation of such control data. Therefore, the present invention provides an apparatus and method for circumventing needless signal transformation of control data.

A terminal adapter 134 taps data and control lines associated with analog modem microcontroller 118 which provides both control data and information data to a DSP 122. However, a register 142 in terminal adapter 134 monitors such data and forwards it to a comparator 144 for evaluation.

In the present invention, call setup or control signals, typically DTMF tones, remain in the digital domain and are transmitted over data lines in a serial or parallel format such as a byte or n-bit wide format.

In the present invention, the first four bits of an 8-bit byte are defined as control signals with the remaining four bits defining variable designators such as a DTMF tone designator. For example, the first four bits of a control byte may provide information as to the content of the second four bits. Therefore, when an analog modem is transmitting a DTMF tone, the first four bits may designate that a DTMF tone, such as an ATD command, is being transmitted while the second four bits designate which of the DTMF tone is being sent. Other control information may also be transmitted using this method. For example, the first four bits may signify an off-hook designator requesting call setup services by a terminal adapter or the first four bits may designate an end-of-call designator indicating the completion of a communication session.

Comparator 144, therefore, in the preferred embodiment, monitors the first four bits received from register 142 and compares those bits with the known values corresponding to preprogrammed control data values. Therefore, when a corresponding control data is detected, comparator 144 preserves the lower four bits of data by clocking a latch 146. Comparitor 144 further notifies microcontroller 136 of terminal adapter 134. Microcontroller 136 evaluates the received control data and responds consistently therewith. When the control data designates a DTMF tone, microcontroller 136 pulses a buffer 148 to read a corresponding DTMF tone designator. Thus, by digitally transmitting control signals directly from the microcontroller of the analog modem to the microcontroller of the terminal adapter, the introduction of distortion and susceptibility to error through successive signal transformations has been reduced.

Figure 4:
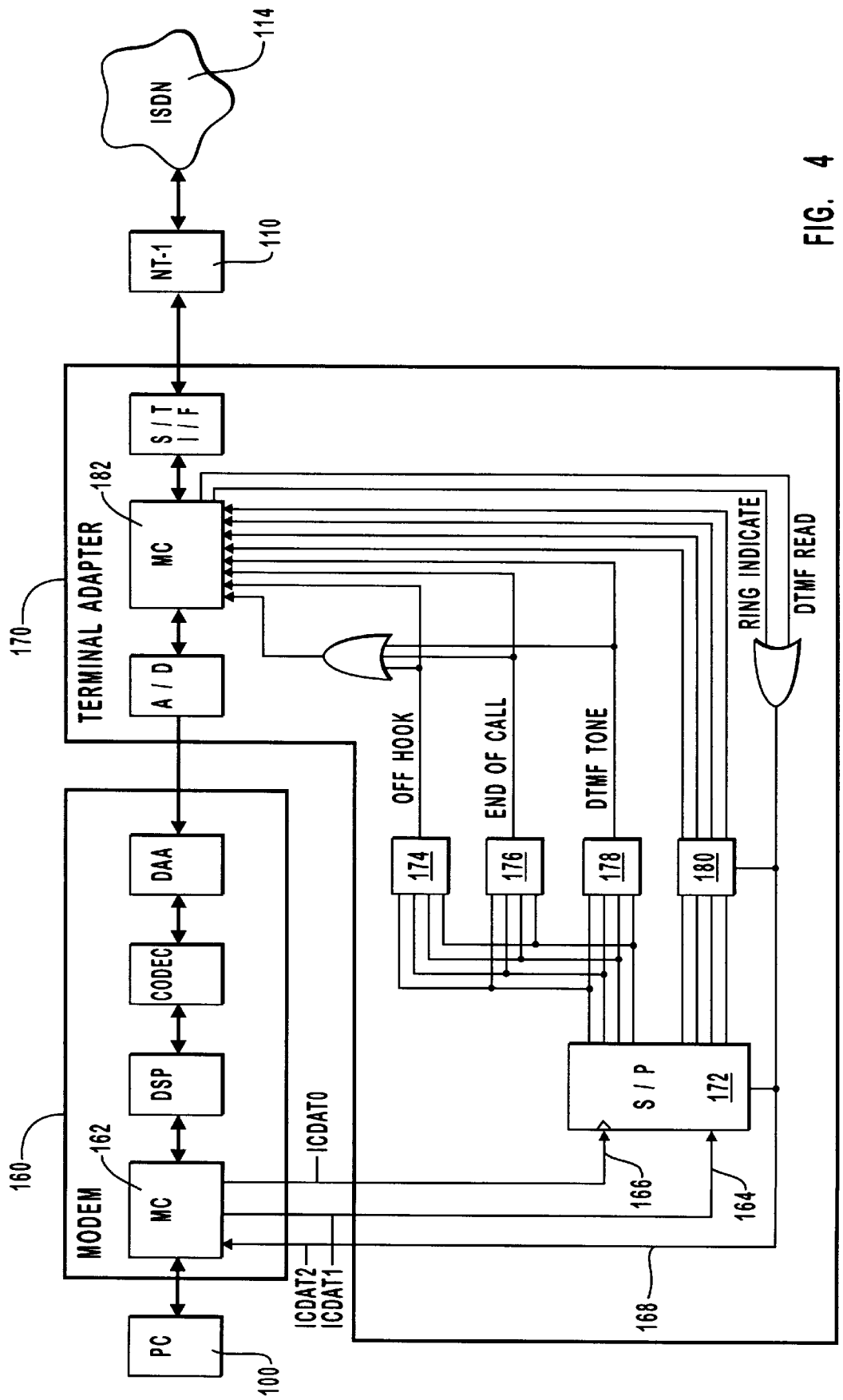
FIG. 4 is a block diagram of a terminal configured with an analog modem having a cellular interface for digitally conveying digital alert tones and control data between a cellular modem and a terminal adapter, in accordance with a preferred embodiment of the present invention.

FIG. 4 is a block diagram of a terminal configured with an analog modem having a serial interface for digitally conveying digital alert tones and control data between a cellular modem and a terminal adapter, in accordance with another preferred embodiment of the present invention. An analog modem 160 specifically configured for interfacing with a cellular transceiver provides a serial interface from a microcontroller 162. A typical serial cellular interface is comprised of an ICDAT0 signal 166, ICDAT1 signal 164, and a receive signal ICDAT2 signal 168. In the present embodiment, a terminal adapter 170 taps or interfaces to the serial modem interface for receiving and evaluating control data. Because such control data is configured in a serial manner, a serial to parallel converter 172 receives serial data on ICDAT1 signal 164 as clocked by ICDAT0 signal 166. Serial to parallel converter 172 then converts the serial control data into parallel control data for evaluation by comparitors 174, 176, and 178. Comparitors 174, 176, and 178, in a preferred embodiment, evaluate the first four bits of the control byte as described above in FIG. 3. When comparitors 174, 176, or 178 detect a match with a known value corresponding to their particular control function, the matching comparitor notifies microcontroller 182 of terminal adapter 170. Microcontroller 182 thereafter discerns which of the control data was received and responds accordingly.

If the control data matches a DTMF tone for call setup, microcontroller 182 reads a latch 180 thereby determining the correct DTMF tone from the DTMF tone designator transmitted in the upper four bits of the control data byte. Microcontroller 182 may then clear the latching means and notify microcontroller 162 of analog modem 160 of the successful read. Alternatively, microcontroller 182 may additionally notify analog modem 160 of an incoming call using a ring indicate signal relayed over ICDAT2 signal 168 to microcontroller 162. Thus, control data may be digitally relayed from analog modem 160 to terminal adapter 170 without requiring signal transformation from digital to analog and back to digital form which may introduce distortion leading to erroneous interpretation of control data by terminal adapter microcontroller 182.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a terminal adapter for facilitating interaction during a communication session between an analog modem and an Integrated Services Digital Network (ISDN), an apparatus for digitally conveying digital alert tones between said analog modem and said terminal adapter comprising:

(a) modem controller access means electrically coupled with a modem controller for receiving modem control data therefrom in digital form, said modem control data being comprised of both said digital alert tones including at least DTMF tones, and information requiring modulation transformation for propagation over said ISDN;

(b) data evaluating means electrically coupled with said modem controller access means to scan said modem control data and identify said digital alert tones; and (c) terminal adapter controller access means electrically coupled both with said data evaluating means and a terminal adapter controller of said terminal adapter for relaying said digital alert tones to said terminal adapter in digital form as generated by said modem controller.

2. The apparatus as recited in claim 1 wherein said modem controller access means comprises a cellular modem interface.

3. The apparatus as recited in claim 2 wherein said modem controller access means further comprises a serial to parallel converter means electrically coupled to said cellular modem interface to provide a parallel interface to said digital alert tones.

4. The apparatus as recited in claim 3 wherein said data evaluating means comprises a modem control data comparative means electrically coupled to said modem controller access means to evaluate said modem control data for said digital alert tones.

5. The apparatus as recited in claim 4 wherein said digital alert tones further comprise:

(a) an off-hook designator to request service by said terminal adapter for an out-going call; and (b) an end-of-call designator indicating completion of said communication session.

6. The apparatus as recited in claim 5 wherein said evaluating means further comprises a DTMF tone designator latching means electrically coupled to said serial to parallel converter means for retaining one of said DTMF tones when detected by said data evaluating means.

7. The apparatus as recited in claim 5 wherein said terminal adapter controller access means further comprises a digital alert tones summing means electrically coupled between said modem control data comparative means and said terminal adapter controller for notifying said terminal adapter controller of said digital alert tones.

8. The apparatus as recited in claim 2 wherein said terminal adapter controller access means further comprises a terminal adapter response summing means electrically coupled between said terminal adapter controller and said analog modem controller for notifying said analog modem of a request to terminate a call and of receipt of said DTMF tone designator.

9. In a terminal adapter for facilitating interaction during a communication session between a cellular modem and an Integrated Services Digital Network (ISDN), an apparatus for digitally conveying digital alert tones between said cellular modem and said terminal adapter comprising:

(a) cellular modem interface means electrically coupled with a cellular modem for receiving modem control data therefrom in digital form, said modem control data being comprised of both said digital alert tones including at least DTMF tones, and information requiring modulation transformation for propagation over said ISDN;

(b) data evaluating means electrically coupled with said cellular modem interface means to scan said modem control data and identify said digital alert tones; and (c) terminal adapter controller access means electrically coupled both with said data evaluating means and a terminal adapter controller of said terminal adapter for relaying said digital alert tones to said terminal adapter in digital form as generated by said modem controller.

10. The apparatus as recited in claim 9 wherein said cellular modem interface means further comprises a serial to parallel converter means electrically coupled to said cellular modem to provide a parallel interface to said digital alert tones.

11. The apparatus as recited in claim 10 wherein said data evaluating means comprises a modem control data comparative means electrically coupled to said cellular mode interface means to evaluate said modem control data for said digital alert tones.

12. The apparatus as recited in claim 11 wherein said digital alert tones further comprise:

(a) an off-hook designator to request service by said terminal adapter for an out-going call; and (b) an end-of-call designator indicating completion of said communication session.

13. The apparatus as recited in claim 12 wherein said evaluating means further comprises a DTMF tone designator latching means electrically coupled to said serial to parallel converter means for retaining one of said DTMF tones when detected by said data evaluating means.

14. The apparatus as recited in claim 12 wherein said terminal adapter controller access means further comprises a digital alert tones summing means electrically coupled between said modem control data comparative means and said terminal adapter controller for notifying said terminal adapter controller of said digital alert tones.

15. The apparatus as recited in claim 9 wherein said terminal adapter controller access means further comprises a terminal adapter response summing means electrically coupled between said terminal adapter controller and said cellular modem interface for notifying said cellular modem of a request to terminate a call and of receipt of said DTMF tone designator.

16. In a terminal adapter, a method for digitally conveying alert tones between an analog modem and an Integrated Services Digital Network (ISDN) during a communication session, said method comprising the steps of:

(a) continuously monitoring modem control data as generated by a modem controller of said analog modem in digital form, said modem control data being comprised of both said digital alert tones including at least DTMF tones, and information requiring modulation transformation for propagation over said ISDN;

(b) evaluating said modem control data in said terminal adapter for presence of said digital alert tones as digitally conveyed from said analog modem to said terminal adapter; and (c) when said digital alert tones are detected in said modem control data, digitally conveying said digital alert tones in digital form to a terminal adapter controller in said terminal adapter.

17. The method as recited in claim 16 wherein said monitoring step further comprises the step of operatively interacting with a cellular modem interface of said analog modem.

18. The method as recited in claim 17 wherein said monitoring step further comprises the step of serial-to-parallel converting said modem control data prior to said evaluating step.

19. The method as recited in claim 18 wherein said evaluating step further comprises the step of:

(a) specifying known values of said digital alert tones for digitally transferring between said analog modem and said ISDN; and (b) comparing said modem control data with said known values of said digital alert tones.

20. The method as recited in claim 19 wherein said step of specifying said digital alert tones further comprises the steps of:

(a) designating an off-hook designator for requesting service by said terminal adapter as one of said digital alert tones; and (b) designating an end-of-call designator indicating completion of said communication session as one of said digital alert tones.

21. The method as recited in claim 20 wherein said evaluating step further comprises the step of storing one of said DTMF tones when detected by said comparing step for use by said conveying step.

22. In a terminal adapter for facilitating interaction during a communication session between a cellular modem and an Integrated Services Digital Network (ISDN), a method for digitally conveying alert tones between said cellular modem and said ISDN comprising the steps of:

(a) continuously monitoring modem control data as generated by a modem controller of said cellular modem in digital form, said modem control data being comprised of both said digital alert tones including at least DTMF tones, and information requiring modulation transformation for propagation over said ISDN;

(b) evaluating said modem control data in said terminal adapter for presence of said digital alert tones as digitally conveyed from said cellular modem to said terminal adapter; and (c) when said digital alert tones are detected in said modem control data, digitally conveying said digital alert tones in digital form to a terminal adapter controller in said terminal adapter.

23. The method as recited in claim 22 wherein said monitoring step further comprises the step of operatively interacting with a cellular modem interface of said cellular modem.

24. The method as recited in claim 23 wherein said monitoring step further comprises the step of serial-to-parallel converting said modem control data prior to said evaluating step.

25. The method as recited in claim 24 wherein said evaluating step further comprises the steps of:

(a) specifying known values of said digital alert tones for digitally transferring between said analog modem and said ISDN; and (b) comparing said modem control data with said known values of said digital alert tones.

26. The method as recited in claim 25 wherein said step of specifying said digital alert tones comprises the steps of:

(a) designating an off-hook designator for requesting service by said terminal adapter as one of said digital alert tones; and (b) designating an end-of-call designator indicating completion of said communication session as one of said digital alert tones.

27. The method as recited in claim 26 wherein said evaluating step further comprises the step of storing one of said DTMF tones when detected by said comparing step for use by said conveying step.

* * * * *